E. H. MURRAY.
COOKING APPARATUS.

No. 171,411. Patented Dec. 21, 1875.

Witnesses:
John Keyes

Inventor:
Erastus H. Murray

UNITED STATES PATENT OFFICE.

ERASTUS H. MURRAY, OF ST. PAUL, MINNESOTA.

IMPROVEMENT IN COOKING APPARATUS.

Specification forming part of Letters Patent No. 171,411, dated December 21, 1875; application filed January 27, 1874.

*To all whom it may concern:*

Be it known that I, ERASTUS H. MURRAY, of St. Paul, in Ramsey county and State of Minnesota, have invented an Improved Cooking Apparatus, of which the following is a specification:

The nature of my invention consists in the construction and combination of parts of a cooking apparatus, as hereinafter more fully set forth, the objects of the combination being to produce with the least expense a cooking apparatus peculiarly adapted to cook in the best manner rice, wheat grits, and analogous substances, without danger of burning, and also to steam, stew, and bake by steam or dry heat a great variety of dishes with a minimum amount of fuel and labor, and in the best manner. The whole may be made of tin or other suitable metal.

Figure 2:
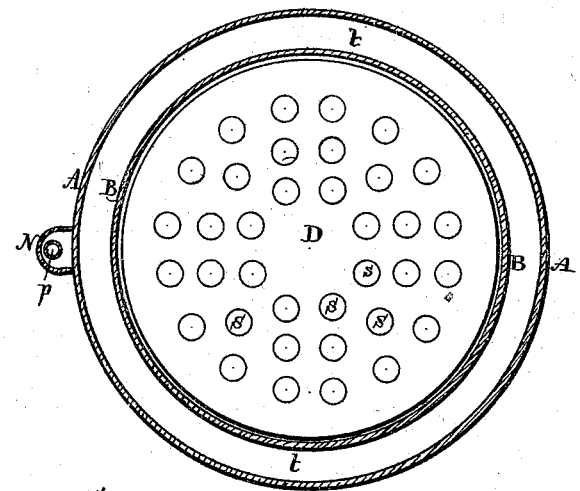
Figure 1:
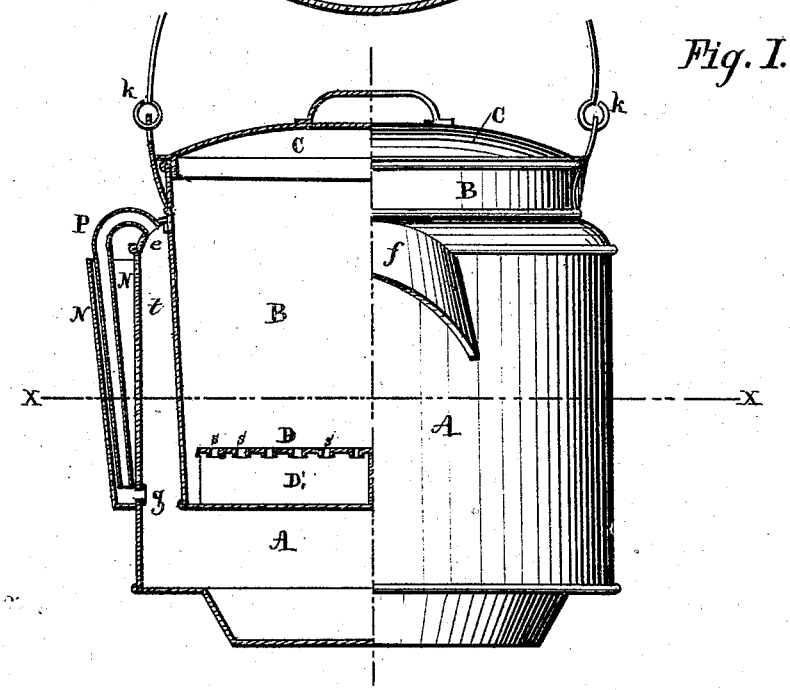

Figure 1 is a side elevation of the combination, with a portion of both vessels broken away to show the internal arrangement. Fig. 2 is a plan of the lower part of the same, bisected at $x$, showing the annular steam-space $t\ t$, the false bottom D, with its perforations $s\ s\ s$, the side attachment N, and steam-tube P. The boiler A is of any convenient size and shape, and has a large opening in the top to receive the cooking-pan B. It has side handles $f$ and a tubular steam-escape, P, attached to the top at $e$, which discharges into the side attachment N. The comparatively cooler surfaces of the pipe P and side attachment N serve to condense the steam, and it then returns as hot water to the boiler through the aperture $g$, with but trifling waste, requiring little attention, and but little fuel to maintain the water at boiling-point. The cooking-pan B is made about one and one-half inch smaller in diameter than the boiler, is lifted by a handle through the ears $k\ k$, and inserted in the opening in the top of boiler A, reaching within a short distance of its bottom, and leaving an annular steam-space, $r\ r$, around between boiler and pan. The pan B is made slightly smallest at the bottom, so as readily to enter the top opening in the boiler, in which it nicely fits, and upon the rim of which it rests on a molding swaged around the pan at the base of the ears $k\ k$. The cover C fits both the cooking-pan and the boiler, and may be used for either, as required. The false bottom D to the cooking-pan may be made of a circular piece of tin, perforated with holes $s\ s\ s$, and having cross-slips of tin set edgewise, soldered to its under side, to raise it a short distance above the true bottom. The object of this is to leave space D', Fig. 1, for water or gravies, when desired.

For common boiling the boiler A and cover C are used alone. For cooking gruels, rice, puddings, stews, &c., a small quantity of water is put in the boiler A. The cooking-pan B, containing the substance, is inserted without the false bottom.

Green corn, some puddings, in fact a great variety of foods, are best cooked by steam, for which purpose insert the false bottom D, placing beneath it a small quantity of water properly seasoned.

For hot-air baking the water in space D' is omitted.

I make no claim to a double cooking-vessel as such merely, being aware that such vessels have been heretofore in use; but

What I claim as my invention is—

The combination of the vessel A, having extended ears $k\ k$, side attachment N, curved exterior pipe P, openings $e\ g$, communicating with the pipes at the lower and upper parts of vessel A, and the tapering vessel B, having perforated false bottom D, leaving the annular steam-space $t$ between the vessels, all constructed substantially as set forth.

ERASTUS H. MURRAY.

Witnesses:
THOMAS SIMPSON,
A. H. SNOW.